Feb. 22, 1927.
E. C. WILSON
TOOL JOINT
Filed July 29, 1922
1,618,253
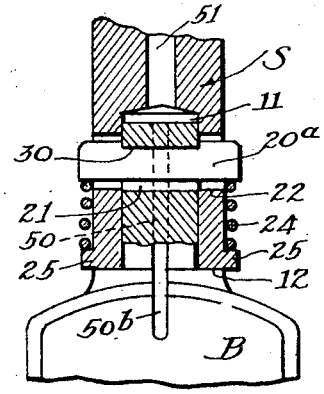
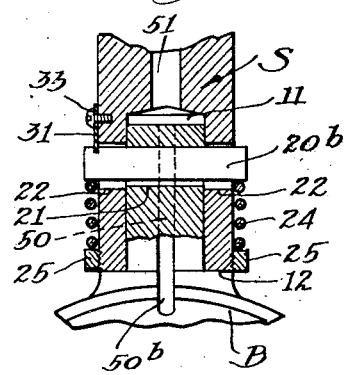
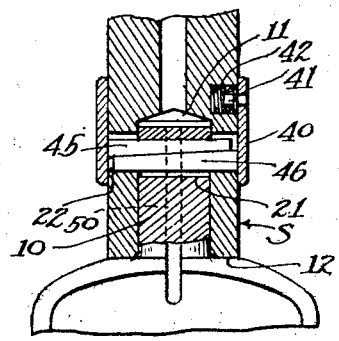
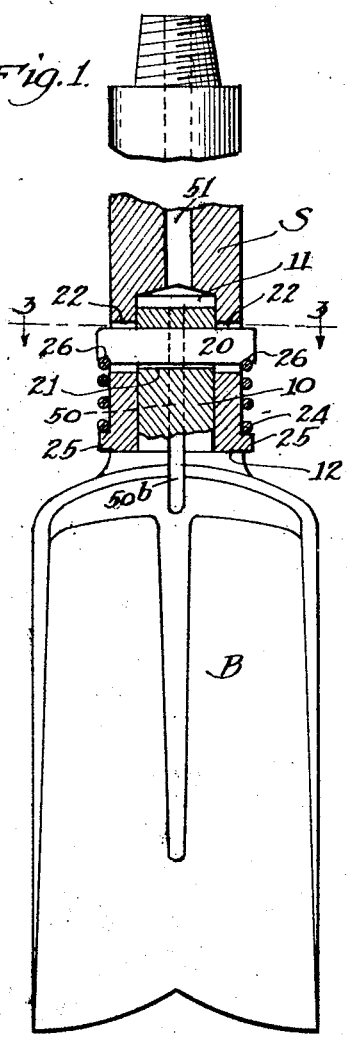
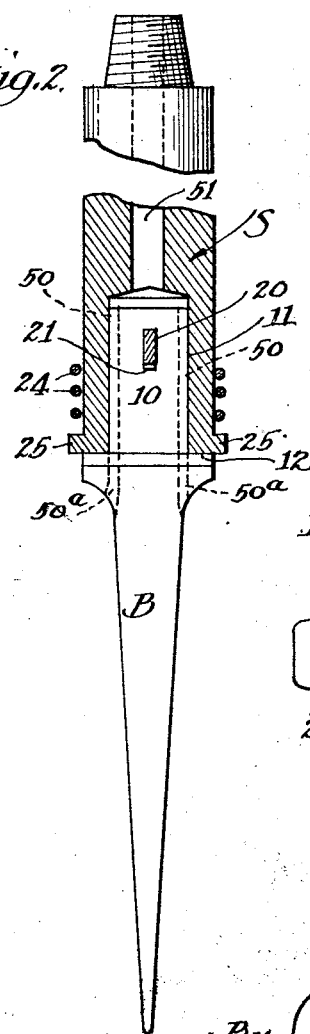
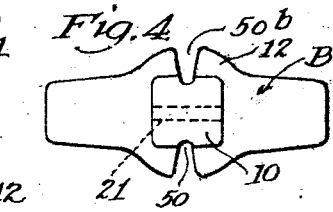
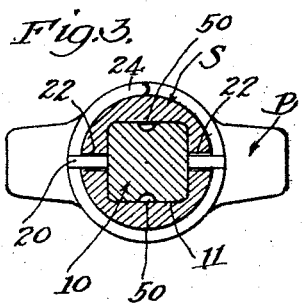
Inventor:
Elihu C. Wilson
By James T. Burleson
his Attorneys Patented Feb. 22, 1927.                                               1,618,253

UNITED STATES PATENT OFFICE.

ELIHU C. WILSON, OF LOS ANGELES, CALIFORNIA.

TOOL JOINT.

Application filed July 29, 1922. Serial No. 578,429.

This invention relates to joints for tools, jointed stems, or the like. Although it will be understood that the joint herein explained may be useful in many situations where it is desired to create a rotary driving joint, yet the joint hereinafter explained as an illustration of the invention is specifically designed, in its details, for attaching rotary drilling tools to a rotary drilling stem.

Heretofore it has been the practice to attach a rotary drill bit to the stem by a screw-threaded joint; but I have found that such joints have disadvantageous features, and it is a general object of this invention to overcome those features and to provide a tool joint in which the disadvantages are totally eliminated. In a screw-threaded joint it is obvious that a backward rotation of the tool will tend to, and sometimes does, unscrew the bit from the stem. In certain circumstances it is sometimes desirable in rotary drilling to back up the tool; and in so doing the bits are frequently lost in the hole. Then again, the constant forward rotation of the bit, and the consequent tightening strain on the screw-threaded joint, tends to set the joint up so tightly that at times it is very difficult to remove the bit when the tool is taken out of the well for sharpening. As some rotary bits have to be sharpened very frequently, the loss of time in removing the bit from the drill stem becomes a very considerable item.

The fact that a screw-threaded joint must be machined also imposes a limitation on the bit, in that the bit must be made of material that can be machined; and further must be made of a material that is suitable to produce strong screw threads. Thus, a material that is used in such a bit is more or less limited to the softer kinds of steel, because a hard steel, such as manganese steel, will not machine satisfactorily and is too brittle to be used in the screw-threaded joint. Consequently, in manufacturing these bits it is necessary to make them out of such a material as can be machined, and then to temper the drilling end of the bit. Such bits it is necessary to remove from the hole very often for resharpening and tempering. It is one of the objects of this invention to provide a joint construction that can be manufactured without the necessity of any machining, and thereby provide that the bit may be made of any suitable material selected with due regard to its greatest cutting and wearing qualities. Furthermore, it is a general object to provide a type of construction that involves no small joint parts, such as screw-threads; and therefore a type of joint construction that can be made of a comparatively hard and strong steel. Thus the joint itself is made much stronger at the same time that the bit is made to have a much longer life with resharpening. And, furthermore, it will be readily recognized that the production of the joints without the necessity of any machine works, or with a minimum of machine works, greatly reduces the cost of manufacture of the drill stem itself and of the bit.

With these preliminaries in mind, the invention will now be best understood from the following detailed description of preferred forms of the joint, the drill stem, and the bit, illustrative of the invention; and for this purpose reference is had to the accompanying drawings, in which:

Fig. 1 is a side elevation, and vertical longitudinal section in part, showing one form of my invention; Fig. 2 is an edge elevation and vertical longitudinal section of the parts shown in Fig. 1; Fig. 3 is a section taken on line 3—3 of Fig. 1; Fig. 4 is a plan showing the upper end of the bit itself; Fig. 5 is a fragmentary section similar to the section of Fig. 1 showing a modified structure; Fig. 6 is a similar section showing another modified structure; and Fig. 7 is a similar section showing another modified structure.

In the drawings I show, by way of illustration one form of bit that may be used in my invention, a fishtail bit, B. It will be understood, of course, that this illustration of a bit is indicative of any kind of bit used in rotary drilling. The attributes of strength, simplicity, long life and wearing qualities, lack of machine work, and general inexpensiveness of production, are applicable, at least partially, to other styles of bits as well as to a fishtail bit.

At S I show the lower section of a typical drill stem. It is the joint arrangement between the drill stem and the drilling bit, and the appurtenances of that joint arrangement that form the subject-matter of this invention. In this application I have shown and will describe one kind of joint, viz, one that depends for rotary driving connection upon the interfitting of a square or other polygonal bit shank in a correspondingly shaped socket. In a copending application filed on even date herewith, Serial No. 578,430, and also entitled Tool joint, I explain another form of joint which depends for its rotary jointed connection on a sort of arrangement that may be briefly described as involving clutch recesses and lugs. This driving arrangement may be used in connection with a shank and socket either round or of any other suitable configuration. The claims of these two applications are correspondingly divided from each other; the claims generic to both forms being included in this application.

The form of device shown in Figs. 1 to 4 embodies a shank 10 at the upper end of bit B, fitting in a socket 11 in the lower end of drill stem S. The shank 10 here may be of any suitable polygonal configuration: for instance, square. It is not necessary that the shank fit the socket tightly; they can both easily be forged to their finished dimensions and fit tightly enough; or, at the most, a slight application of a grinder wheel to the shank will fit the parts sufficiently well. I may say here that the shank and socket may be slightly tapered; the tapered socket may be more easily forged than a straight one. Bit B has an upwardly facing shoulder 12 that bears against the lower end surface of stem S. The corners of the shank and socket may be somewhat rounded for ease of manufacture.

Various arrangements may be used to hold the bit in proper relation to the drill stem,—to hold stem 10 up in socket 11 and to hold shoulder 12 firmly up against the lower end of drill stem S. In the figures that I have been describing, and in Figs. 5 and 6, I show spring means for holding the parts in position; while in Fig. 7 I show a wedge means. These various means will be suggestive of other means that may be used and which will readily occur to those skilled in the art. The distinctive feature as regards the present invention, is that these means will be readily releasable, so that the bit may be readily and easily removed from the stem.

For instance in Figs. 1 and 2 I show a transverse key 20 extending transversely through a slot 21 in shank 10 and through slots 22 in the drill stem. The outer ends of this key project beyond the exterior surface of the drill stem; and a fairly heavy spring 24 presses upwardly on the opposite ends of the key, the spring being seated below on a shoulder 25 that may be made integral with the drill stem, or may be, as shown in Fig. 6, made in a separate piece and secured in any suitable manner. To prevent longitudinal movement of the key 20—to prevent the key from being displaced from proper position—I may cut two notches 26 near the ends of the key, these notches being engaged by spring 24 in the manner illustrated. In order to remove the key the spring is pressed down out of the notches before the key is moved endwise. Then the key may be easily removed and bit B can then be freely dropped out of stem S. The spring 24 is sufficiently strong to support bit B firmly in position and to keep the bit from dropping away from its shouldered engagement with the end of the drill stem at any time. It will be understood that the major strains, during drilling, are those tending to twist the bit in relation to the stem and strains caused by the weight of the stem on the bit, and that there is not at any time any great strain tending to pull the bit out of the socket. However, if the bit should become stuck and the stem pulled upwardly with some considerable force to remove the bit, the key 20 merely moves down to the lower end of slots 22, compressing spring 24 to that extent.

In Fig. 5 I have shown a key 20ª of slightly different form, having a recess 30 in its upper edge taking around shank 10 and thus preventing displacement of the key.

In Fig. 6 I show a key 20ᵇ that is prevented from displacement by a clip or key or the like, such as illustrated at 31. This may be held in place by a small machine screw 33.

In Fig. 7 I show the bit and shank supported entirely by a wedge or wedges, without the use of a supporting spring. Here I have shown a pair of wedges 45 and 46 extending through the shank and stem slots 21 and 22. By driving them into place, the bit is held up in proper shouldered engagement with the stem. Of course it will be apparent that instead of using a pair of wedges a single wedge key may be used. In order to prevent displacement of the wedge keys I may use, for instance, a collar 40, slidable on stem S, but normally held in its proper position, as shown in the drawings, by a pin 41 set in a recess 42 in stem S and pressed outwardly by a spring 43; the outer end of the pin entering an aperture in ring 40. By pressing pin 41 back into recess 42 the collar 40 may then be moved away from the wedges 45 and 46, and the wedges may then easily be driven out and the bit freely removed from the stem.

It will be apparent from the foregoing description that all the parts I have described may be easily made without the necessity of any machine work, or with a minimum of machine work. And also it is not necessary that the shanks fit the sockets with any great degree of accuracy or tightness. They do not have to fit tightly to get good rotary driving contact. And it is not a necessity that the bit be held entirely tightly in the lower end of the stem. Also the key slots may likewise be forged; it is not necessary that they be of any great accuracy; or if they are not forged they may easily be cut by a simple machining operation. Any inaccuracy in the keys or slots is of course taken up by spring 24, in the spring support forms; or is taken up in the form shown in Fig. 7 by driving keys 45 and 46 a proper distance into the slots.

Furthermore, in order to simplify the manufacture of the bits, I may not use the central water course that has been usually used in drilling bits of this character. Such water courses have ordinarily been drilled down through the center of the usually screw-threaded shank, and then holes have been drilled in angularly from the sides of the bit to the vertical central water passage. I may make my water passages as a groove or grooves at the side of shank 10. For instance, I may form two grooves at opposite sides of the shank; and then I may lead those grooves 50 on through the shoulder 12 either as a short drilled hole, as for instance I have shown at 50ª in Fig 2; or I may lead those grooves on through the shouldered part 12 as grooves 50ᵇ, as shown in the other figures. This last mentioned form may be forged entirely. These water course grooves communicate with the water circulation passages 51 that extend through the drill stems.

Having described a preferred form of my invention, I claim:

1. A joint for well drilling tools, embodying, in combination with two members one of which has a socket at its end and the other has a shank at its end entering the socket, the socketed member having a closed-ended key slot through its socket wall, the shanked member having a key slot through its shank, a removable transverse key extending through the slots, and spring means acting on the key to press it longitudinally of said members in a direction to hold the shank in the socket.

2. A joint for well drilling tools, embodying, in combination with two members one of which has a socket at its end and the other has a shank at its end entering the socket, the socketed member having a closed-ended key slot through its socket wall, the shanked member having a key slot through its shank, a transverse key extending through the slots and removable endwise, a coiled spring surrounding the socketed member and bearing against the key to press it longitudinally in a direction to hold the shank in the socket, a seat for the spring on the socketed member, and a shank fitting recess on the side of the key opposite the spring preventing endwise movement of the key when the spring is pressing against it.

3. A joint for well drilling tools, embodying, in combination with two members one of which has a socket at its end and the other has a shank at its end entering the socket, the socketed member having a closed-ended key slot through its socket wall, the shanked member having a key slot through its shank, a removable transverse key extending through the slots, the ends of the key extending outside the socketed member, and a spring surrounding that member and supporting the key by engaging its ends.

4. A joint for well drilling tools, embodying, in combination with two members one of which has a socket at its end and the other has a shank at its end entering the socket, both socket and shank being polygonal in cross-section so as to rotatively connect the two members, and the shank fitting the socket somewhat loosely, the socketed member having a closed-ended key slot through its socket wall, the shanked member having a key slot through its shank, a transverse key extending through the slots and removable endwise, a coiled spring surrounding the socketed member and bearing against the key to press it longitudinally in a direction to hold the shank in the socket, and a seat for the spring on the socketed member, and a shank fitting recess on the side of the key opposite the spring preventing endwise movement of the key when the spring is pressing against it.

In witness that I claim the foregoing I have hereunto subscribed my name this 6th day of July, 1922.

ELIHU C. WILSON.